May 4, 1948.  P. DADDIO  2,440,740
PNEUMATIC TIRE SPREADER
Filed March 6, 1944
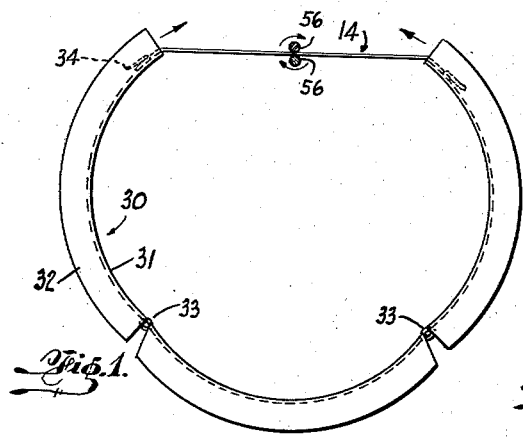
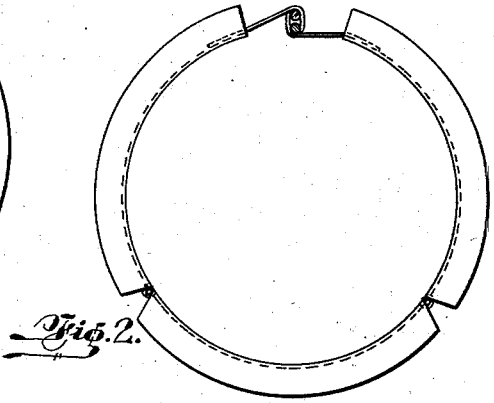
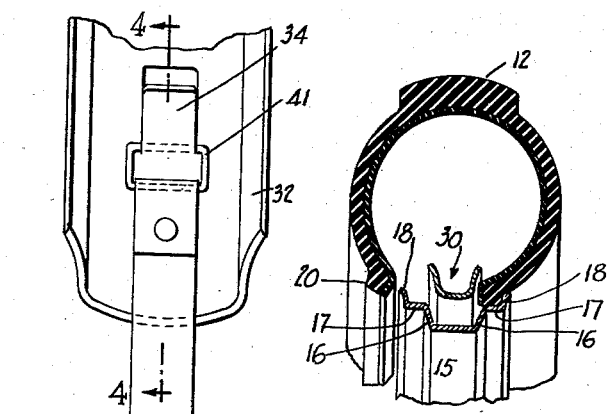
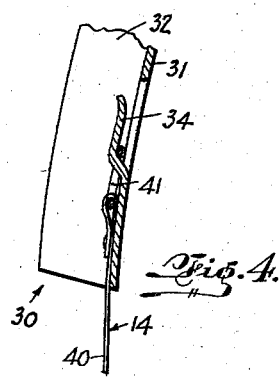
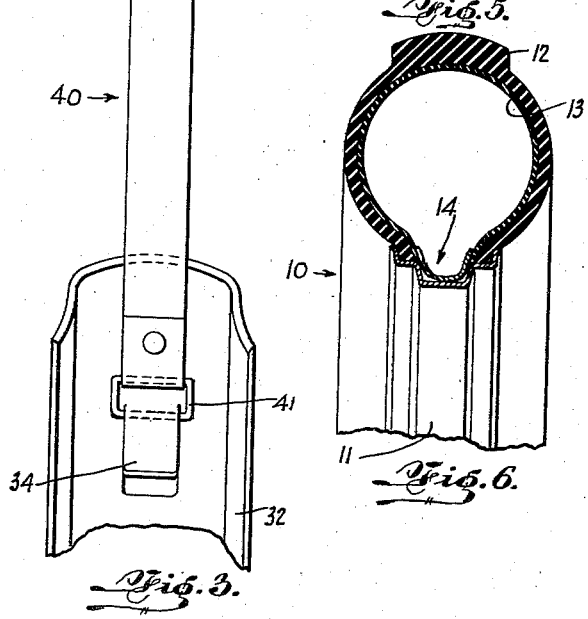
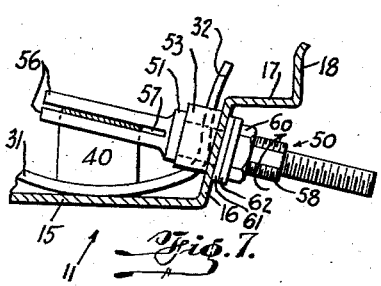
INVENTOR
PASQUALE DADDIO.
BY
ATTORNEY.

Patented May 4, 1948

2,440,740

UNITED STATES PATENT OFFICE 2,440,740

PNEUMATIC TIRE SPREADER

Pasquale Daddio, New York, N. Y.

Application March 6, 1944, Serial No. 525,158

4 Claims. (Cl. 152—400)

This invention relates to pneumatic tires. It is particularly directed to self-sealing tires for automobiles and the like vehicles.

An object of this invention is to provide in a tire of the character described, highly improved means for assembling the tire carcass and the tire rim.

Another object of this invention is to provide in a tire of the character described highly improved means to apply an inner self-sealing lining to the tire carcass.

Still another object of this invention is to provide a tire of the character described having means to prevent loosening of the tire on the rim while in use.

Yet a further object of this invention is to provide a strong and durable tire construction of the character described which shall be relatively inexpensive to manufacture, easy to assemble and disassemble and which shall yet be practical and efficient to a high degree in use.

Other objects of this invention will in part be obvious and in part hereinafter pointed out.

The invention accordingly consists in the features of construction, combinations of elements, and arrangements of parts which will be exemplified in the construction hereinafter described, and of which the scope of application will be indicated in the following claims.

In the accompanying drawing, in which is shown various possible illustrative embodiments of this invention:

Fig. 1 is a side elevational view of an assembled clamp for assembling a tire with a tire rim and embodying the invention, and showing the strap opened up.

Fig. 2 is a view similar to Fig. 1 but showing the clamp tightened up and in the position it assumes when the tire is assembled.

Fig. 3 is an enlarged outer view of a portion of the tire clamp.

Fig. 4 is a cross-sectional view taken on line 4—4 of Fig. 3.

Fig. 5 is a transverse cross-sectional view through a tire and rim embodying the invention and illustrating one step in the assembly of the tire.

Fig. 6 is a view similar to Fig. 5, but showing the tire assembled with the rim.

Fig. 7 is an enlarged cross-sectional view of a portion of the rim and assembled clamp and illustrating the air valve provided with means for tightening up the clamp.

Referring now in detail to the drawing, 10 designates an assembled tire and rim for the wheel of an automobile or the like vehicle, in assembled condition. The same comprises an annular metal tire rim 11 on which is mounted a tire carcass 12 provided with an inner lining 13 and assembled with said rim by means of a clamp 14.

The metal rim 11 comprises an inner annular wall 15 from the sides of which extend outwardly inclined walls 16. Extending outwardly from walls 16, are annular cylindrical walls or shoulders 17. Extending outwardly from walls 17 are flanges 18.

The carcass or shoe 12 may be made of any suitable construction and is formed with inner beads 20. The lining 13 is made of the same rubber as is used for an inner tube. The lining 13 is made by building a tire or carcass right onto the lining while both are still uncured and then curing the lining and the carcass at the same time so as to vulcanize the lining directly onto the inside of the carcass. Thus should a hole or puncture be formed in the tire extending through the lining, said lining being of soft rubber will seal itself.

Highly improved means 14 is provided for clamping the carcass 12 to the rim 15. Said clamping device 14 comprises three substantially similar hinged-together sections 30 in tandem made of sheet metal and of substantial U-shaped transverse cross-section. Thus each section 30 has an inner wall 31 and outwardly divergent side walls 32. Each section is hinged to an adjacent section by a hinge 33. Although the drawing illustrates member 14 as composed of three sections it will be understood that the same may consist of any suitable number of sections 30. The adjacent ends of the bottom walls 31 of the end sections 30 are formed with struck-up rearwardly extending hooks 34 for the purpose hereinafter appearing.

Interconnecting said adjacent ends is a band 40. The band 40 may be made of flexible steel or any other suitable flexible material and is connected to loops 41 at the ends thereof engaging the hooks 34. Band or strip 40 is thus removably or detachably connected to member 14.

It will now be understood that when the clamping member 14 is opened up it can easily fit over the tire rim 15 to be inserted over the tire. Sections 30 only surround a major portion of rim 11.

Means is provided to wind up the band 40 so as to close the clamp 14 about the rim of the tire for clamping the beads 20 of the carcass 12 against the flanges 18 of the rim 11. It will be understood that the sections 30 fit in between the beads 20 of the carcass, and when the strap 40 is tightened, are adapted to press said beads tightly against the flanges 18 of the tire rim 11. To this end one of the walls 16 of rim 11 is formed with a through opening and extending therethrough is an air valve 50. The head 51 of the air valve is located within the rim. Interposed between the head 51 and wall 15 is a rubber washer 53. The air valve 50 is provided with a pair of parallel spaced rod extensions 56 formed with a space or slot 57 therebetween.

It will be noted that the rods 56 project between the pair of end sections 30 and receive the band 40 within the slot 57.

On the screw threaded portion or key 58 of the air valve is a lock nut 60. Interposed between the lock nut 60 and the exterior surface of wall 16 is a lock washer 61 and a plain washer 62. When the lock nut 60 is loosened, the air valve 50 may be rotated in a clockwise direction as shown in Fig. 1 of the drawing to tighten and shorten the band 40 as illustrated in Fig. 2 of the drawing. As band 40 is shortened the sections 30 will close in about the rim 11 and will compress the beads of the carcass against said rim. When the air valve is sufficiently tightened up, the lock nut 60 is tightened to keep the tire tightly clamped on the rim.

It will now be understood that the key on air valve is turned clockwise to tighten the band for bringing the sections in tight engagement against the bead or tire so as to press the same into intimate engagement with the rim of the wheel. The nut is then locked up tightly against the lock washer and the plain washer so that any strain on the band tending to unwind it would also tend to rotate the valve stem counterclockwise and thus tend to tighten the nut.

If it is desired to disassemble the tire from the rim, the lock nut 60 is loosened, then the valve 50 can be unwound.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, what I claim as new and desire to secure by Letters Patent is:

1. In combination, a drop center tire rim, a tire carcass thereon, means within said carcass clamping said carcass to said rim, said means comprising a member partly surrounding said rim engaging said carcass and composed of a plurality of sections pivoted end to end, flexible means detachably interconnecting the ends of the end sections, means on the rim operable from without the tire carcass to wind up said flexible means within the said carcass for drawing the ends of said member together to tighten said member onto said rim, and means to prevent unwinding of said flexible means.

2. In combination, a drop center tire rim, a tire carcass thereon, means within said carcass clamping said carcass to said rim, said means comprising a member partly surrounding said rim engaging said carcass, flexible means interconnecting the ends of said member, means on the rim to wind up said flexible means for drawing the ends of said member together to tighten said member onto said rim, and means to prevent unwinding of said flexible means, said winding means comprising an air valve provided with a pair of spaced parallel rod extensions receiving said flexible means therebetween.

3. In combination, a drop center tire rim, a tire carcass thereon and a device within said carcass clamping said carcass to said rim to provide a tight air-seal therewith, said device comprising a curved jointed member and a flexible band interconnecting the ends of said member, and means on the rim to wind up said flexible band within the tire carcass for drawing the ends of said member together to clamp the carcass tightly against the rim to produce an air seal therebetween.

4. In combination, a drop center tire rim, a tire carcass thereon and a device within said tire carcass clamping said carcass to said rim to provide a tight air-seal therewith, said device comprising a curved jointed member and a flexible band interconnecting the ends of said member, and means on the rim to wind up said flexible band for drawing the ends of said member together to clamp the carcass tightly against the rim to produce an air seal therebetween, and means to prevent unwinding of said flexible means, said winding means comprising an air valve provided with a pair of spaced parallel rod extensions receiving said flexible band therebetween.

PASQUALE DADDIO.

REFERENCES CITED

The following references are of record in the file of this patent:

UNITED STATES PATENTS

| Number | Name | Date |
|---|---|---|
| 548,926 | Phelps | Oct. 29, 1895 |
| 632,028 | Smith | Aug. 28, 1899 |
| 1,835,415 | Martin | Dec. 8, 1931 |
| 1,862,313 | La Brie | June 7, 1932 |
| 1,982,135 | Daddio | Nov. 27, 1934 |
| 1,992,514 | Taylor | Feb. 26, 1935 |
| 2,381,382 | Hale | Aug. 7, 1945 |

FOREIGN PATENTS

| Number | Country | Date |
|---|---|---|
| 571,387 | France | 1924 |